March 2, 1937. G. W. TEMPLE 2,072,840
MANDREL REGISTERING MECHANISM FOR ENAMELING MACHINES
Filed Nov. 8, 1935
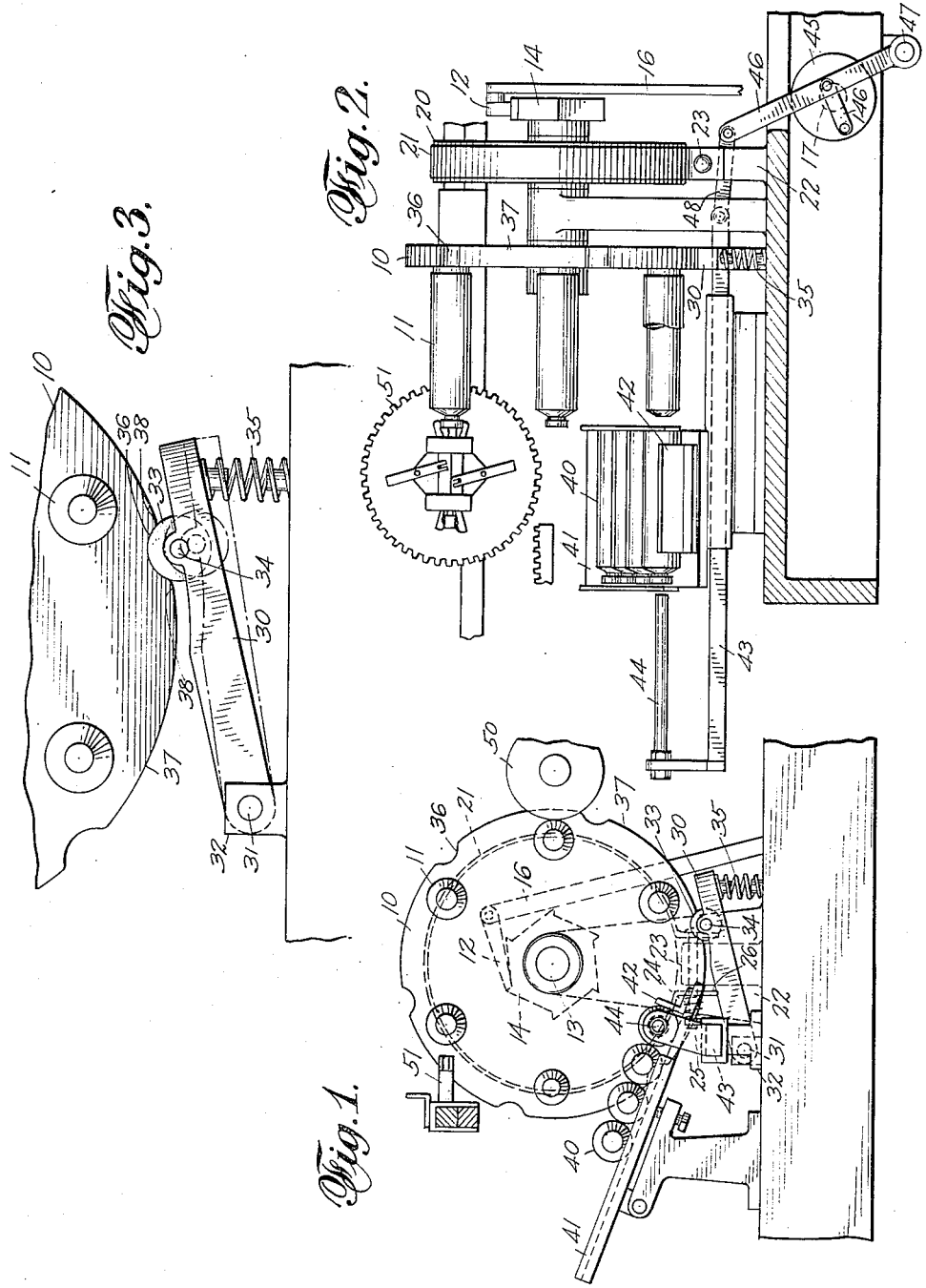
INVENTOR
George W. Temple
BY
Harry Jacobson
ATTORNEY Patented Mar. 2, 1937

2,072,840

UNITED STATES PATENT OFFICE 2,072,840

MANDREL REGISTERING MECHANISM FOR ENAMELING MACHINES

George W. Temple, New York, N. Y., assignor to Victor Metal Products Corporation, Brooklyn, N. Y., a corporation of New York Application November 8, 1935, Serial No. 48,943

2 Claims. (Cl. 91—60)

This invention relates to enameling machines on which a coat of enamel is applied to collapsible tubes during the process of their manufacture, and relates particularly, to the means for insuring the proper positioning of the mandrels of such machines.

Difficulty has been experienced in enameling machines in arranging the mandrels thereof accurately in the proper position whereby tubes may be mounted on the mandrel and dismounted therefrom by means of suitable mechanism such as shown, for example, in the patent to Walter Prussing, No. 1,839,438, for Method and mechanism for making collapsible tubes.

In enameling machines of the type here involved, a turret carrying a plurality of mandrels is intermittently rotated. The turret, however, frequently fails to come to rest in the precise position in which the mandrel should be arranged to have a tube mounted thereon or dismounted therefrom by mechanical means, whereby the tube is crushed or otherwise damaged, resulting in large losses. This is particularly true in connection with tubes made of aluminum, since aluminum tubes tend to stick to the mandrel and unless accurately aligned therewith or with the conveyor pin on which the tubes are to be mounted after enameling, such tubes are frequently crushed or collapsed during the mounting or dismounting operation and spoiled.

My invention contemplates the provision of means which will avoid damage to the tubes by insuring the proper and accurate positioning of the turret and of the mandrels thereon in the tube mounting and dismounting positions thereof.

My invention further contemplates the provision of means for preventing over-running or excess movement of the turret in between mounting and enameling operations.

The various objects of my invention will be clear from the description which follows and from the drawing, in which Fig. 1 is an end elevation of an enameling machine to which my invention has been applied.

Fig. 2 is a side elevation thereof.

Fig. 3 is a fragmentary enlarged elevation of the means for accurately positioning the turret.

In the practical embodiment of my invention which I have illustrated by way of example, said invention has been applied to a tube enameling machine of the usual type. Such machine comprises the turret 10, on which are mounted a plurality of mandrels 11, each of said mandrels being rotatable about a suitable shaft secured to the turret or each mandrel being individually mounted and adjustable radially by means of an adjustable mounting block such as is shown and described in my copending application for patent for Adjustable mandrel for tube printing machines.

The turret is rotatably mounted on the shaft 13 and is intermittently rotated by any suitable means such as the ratchet wheel 14 on the shaft 13, and the pawl 12. Said pawl is reciprocated by any suitable mechanism as for example, the link 16 which is in turn reciprocated by a suitable crank on the shaft 17. It will be seen that on reciprocation of the link 16, the pawl 12 first slides over the ratchet wheel 14 until it engages one of the teeth thereof, whereafter on the stroke of the pawl in the other direction, the ratchet wheel is rotated, thereby rotating the shaft 13 and the turret 10 through an approximate predetermined distance.

I have found, however, that the rotation of the turret 10 by means of the ratchet wheel 14 and pawl 12 is not sufficiently accurate to arrange the mandrels 11 in their proper positions while the turret is at rest for the reception of tubes and for the dismounting of tubes mechanically. Excess movement of the turret 10 may be in part prevented by means of a suitable brake, tending to resist rotation of the shaft 13. Said brake, which has been heretofore used for this purpose, comprises the drum 20 fixed to the shaft 13 and the brake band 21 clamped about the outer surface of the drum and secured to any suitable part of the machine frame 22 as by means of the bolt 23. As shown in Fig. 1, a suitable spring as 24 may be interposed between the nut 25 of the bolt and the ear 26 of the brake band to adjust the pressure of the band on the drum.

The braking means provided for the shaft 13, however, is not completely efficient to effect accurate positioning of the mandrels 11. To insure such precise and accurate positioning as will avoid all possibility of damage to the tube, during the mounting and dismounting operation and regardless of whether the brake is used, or not, I have provided means adapted to engage the turret 10 when said turret has been advanced approximately into its proper position by the ratchet and pawl drive mechanism therefor. Said means comprises the lever 30 pivoted at one end as at 31 to a suitable bracket as 32 and carrying the roller 33 on the shaft 34 near its other end. A suitable spring such as the compression spring 35 engages the free end of the lever and urges the roller 33 at all times toward the turret, the roller thereby engaging the peripheral edge 37 of the turret during the intermittent movement of the turret.

A series of notches as 36 are made in the peripheral edge 37 of the turret 10, said notches being spaced apart to correspond with the angular spacing of the mandrels. Each of said notches 36 is of substantially the same curvature as the roller 33 and subtends an angle of less than 180° and preferably of about 120°. Where the curved notch 36 joins the surface 37 of the turret, I prefer to provide a curve or fillet as 38 to permit the roller 33 to roll easily into and out of the notch when the turret rotates.

It will be understood that as the turret is rotated by its ratchet drive intermittently, the roller 33 rides on the surface 37. As the turret reaches the position into which it is to be held at rest, the inner part of the roller 33 rolls into the notch 36 and holds the turret in the correct position for the mounting of a tube on the proper mandrel 11. Should the ratchet drive tend to advance the turret 10 too far, the roller 33 serves to swing the turret back to its proper position when the turret is released by the pawl 12, the roller entering the notch 36 under the influence of the spring 35. Should the turret not have been advanced quite far enough, the engagement of the roller with the notch surface will carry the turret forward to its proper exact position.

The collapsible tubes 40 are fed to the machine by placing them on the inclined chute or slide 41, the tubes rolling down to a suitable stop 42. When resting against said stop 42, the axis of the tube is arranged in exact alignment with the axis of the mandrel 11 on which the tube is to be mounted. The means for mounting the lowest tube on the chute on to the mandrel comprises the reciprocatory rod 43 suitably guided for horizontal movement and provided at its end with the tube engaging portion 44.

The slide rod 43 is moved toward the right as viewed in Fig. 2 to carry the tube along the stop 42 and onto the mandrel 11. The reciprocatory movement is imparted to the rod 43 by means of the crank 45 mounted on the shaft 17 and provided with a link 146 pivoted to the crank and to the lever 46. Said lever 46 is pivotally supported at its lower end 47 and at its upper end is connected by the link 48 to the slide rod 43.

As the shaft 17 rotates, the mounting arm 44 first moves the last tube on the chute on to the mandrel while at the same time, the pawl 12 is moved to engage the next tooth of the ratchet wheel 14. On the further rotation of the shaft, the ratchet wheel and the turret are rotated to carry the next mandrel into the tube mounting position thereof and at the same time, the rod 43 is carried toward the left ready to mount the next tube of the row.

The mounted tube is enameled in the usual manner while the mandrel carrying said tube is at a station other than the mounting station and while the turret is at rest. The enameling coat is applied to the surface of the tube by a suitable enamel carrying roller 50 which engages the tube surface and while rotating the tube, deposits thereon a coat of enamel. By accurately positioning the turret during the rest intervals, not only is the last tube on the chute accurately aligned with the mandrel on which it is to be mounted, but the enameled tube is also accurately positioned for dismounting without danger of damage by the dismounting mechanism 51.

It will be seen that I have provided a simple, comparatively inexpensive but efficient device designed to accurately position the mandrels of an enameling machine in the exact proper positions thereof for tube mounting, dismounting and other purposes, and thereby preventing possible damage to the tube due to relative inaccurate alignment of the tube and the mandrel.

While I have shown and described certain specific embodiments of my invention, it will be understood that I do not wish to limit myself thereto but desire to claim my invention as broadly as may be permitted by the state of the prior art and the scope of the appended claims.

I claim:

1. In a machine for operating upon collapsible tubes, a turret having a series of arcuate notches in the peripheral edge thereof, the extremities of the walls of said notches being reversely rounded, a mandrel carried by the turret adjacent each of said notches, driving means including a ratchet wheel for intermittently rotating the turret, and spring-pressed means registering with the notches for positioning selected mandrels in respective tube-mounting, enameling, and enameled-tube dismounting positions, said last-mentioned means including a revoluble roller arranged to roll on the peripheral edge of the turret during the time that said driving means rotates the turret and to enter one of the notches at the end of each rotational movement of the turret, and to leave the notch entered thereby at the beginning of each of said rotational movements, a lever pivoted at one end and a spring engaging and urging the other end of the lever toward the turret, said roller being pivoted to the lever intermediate said ends.

2. In a machine for enameling collapsible tubes, a turret having a series of equally spaced recesses in the peripheral edge thereof, each of said recesses having an arcuate wall sub-tending an angle of approximately 120° about the center of said arcuate wall, a plurality of mandrels carried by the turret, means for intermittently rotating the turret, including a ratchet wheel and an operating pawl therefor, and means for maintaining the turret at a precise predetermined position between the intermittent movements thereof, comprising brake means for resisting rotational movement of the turret, a lever pivotally mounted near one end thereof, a roller rotatably carried by said lever intermediate the ends thereof, said roller having the same curvature as that of the arcuate walls of the recesses, and a spring at the other end of the lever urging said roller into engagement with the peripheral edge of the turret whereby said roller enters each of the recesses successively during the time when the turret is at rest and thereby positions the turret and the mandrels thereon in accurate predetermined position.

GEORGE W. TEMPLE.